(12) United States Patent
Ureche et al.

(10) Patent No.: US 8,462,955 B2
(45) Date of Patent: *Jun. 11, 2013

(54) KEY PROTECTORS BASED ON ONLINE KEYS

(75) Inventors: Octavian T. Ureche, Renton, WA (US); Nils Dussart, Kenmore, WA (US); Michael A. Halcrow, Bellevue, WA (US); Charles G. Jeffries, Sammamish, WA (US); Nathan T. Lewis, Monroe, WA (US); Cristian M. Ilac, Sammamish, WA (US); Innokentiy Basmov, Redmond, WA (US); Magnus Bo Gustaf Nyström, Sammamish, WA (US); Niels T. Ferguson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/793,455

(22) Filed: Jun. 3, 2010

(65) Prior Publication Data

US 2011/0302398 A1    Dec. 8, 2011

(51) Int. Cl.
*H04L 9/08* (2006.01)
*G06F 11/30* (2006.01)
*G06F 12/14* (2006.01)

(52) U.S. Cl.
USPC ............................ 380/281; 380/284; 713/193

(58) Field of Classification Search
USPC .................................. 380/281, 284; 713/193
See application file for complete search history.

(56) References Cited

U.S. PATENT DOCUMENTS

| | | | |
|---|---|---|---|
| 5,224,166 A | 6/1993 | Hartman, Jr. | |
| 6,550,011 B1 | 4/2003 | Sims, III | |
| 6,813,709 B1 | 11/2004 | Benardeau | |
| 7,506,380 B2 | 3/2009 | Hunter et al. | |
| 7,900,060 B2 * | 3/2011 | Hodzic | 713/193 |
| 8,005,227 B1 * | 8/2011 | Linnell et al. | 380/279 |
| 8,170,213 B1 * | 5/2012 | Harwood et al. | 380/277 |
| 8,190,921 B1 * | 5/2012 | Harwood et al. | 713/193 |
| 2002/0118838 A1 | 8/2002 | Belenko et al. | |
| 2003/0177378 A1 | 9/2003 | Wittkotter | |
| 2005/0114686 A1 | 5/2005 | Ball et al. | |
| 2006/0015946 A1 | 1/2006 | Yagawa | |

(Continued)

OTHER PUBLICATIONS

BitLocker Drive Encryption Technical Overview. Jul. 17, 2009. p. 1-16.*

(Continued)

*Primary Examiner* — Christian Laforgia
(74) *Attorney, Agent, or Firm* — Merchant & Gould P.C.

(57) ABSTRACT

An online key stored by a remote service is generated or otherwise obtained, and a storage media (as it applies to the storage of data on a physical or virtual storage media) master key for encrypting and decrypting a physical or virtual storage media or encrypting and decrypting one or more storage media encryption keys that are used to encrypt a physical or virtual storage media is encrypted based at least in part on the online key. A key protector for the storage media is stored, the key protector including the encrypted master key. The key protector can be subsequently accessed, and the online key obtained from the remote service. The master key is decrypted based on the online key, allowing the one or more storage media encryption keys that are used to decrypt the storage media to be decrypted.

19 Claims, 5 Drawing Sheets

U.S. PATENT DOCUMENTS

| | | | |
|---|---|---|---|
| 2006/0130154 A1 | 6/2006 | Lam | |
| 2007/0113104 A1* | 5/2007 | Witt et al. | 713/193 |
| 2007/0136606 A1* | 6/2007 | Mizuno | 713/189 |
| 2008/0052328 A1 | 2/2008 | Widhelm et al. | |
| 2008/0052537 A1 | 2/2008 | Nishizono | |
| 2008/0065881 A1* | 3/2008 | Dawson et al. | 713/165 |
| 2008/0133905 A1* | 6/2008 | Challener et al. | 713/156 |
| 2008/0263363 A1 | 10/2008 | Jueneman | |
| 2008/0273696 A1* | 11/2008 | Greco et al. | 380/44 |
| 2008/0273697 A1* | 11/2008 | Greco et al. | 380/44 |
| 2008/0294914 A1 | 11/2008 | Lee | |
| 2009/0067633 A1* | 3/2009 | Dawson et al. | 380/279 |
| 2009/0070598 A1 | 3/2009 | Cromer | |
| 2009/0257597 A1* | 10/2009 | Bromley et al. | 380/282 |
| 2009/0307499 A1 | 12/2009 | Senda | |
| 2010/0086134 A1* | 4/2010 | Ureche et al. | 380/277 |
| 2010/0169640 A1* | 7/2010 | Smith et al. | 713/155 |
| 2010/0299539 A1* | 11/2010 | Haines et al. | 713/193 |
| 2011/0022856 A1* | 1/2011 | Ureche et al. | 713/193 |
| 2011/0246785 A1* | 10/2011 | Linsley et al. | 713/189 |

OTHER PUBLICATIONS

"Non-Final Office Action", U.S. Appl. No. 12/509,255, (Jan. 30, 2012),19.

"Introduction to BitLocker FVE", Retrieved at <<http://cryptome.org/isp-spy/win7-bit-spy.pdf>>, 2007, pp. 107.

Phillips, Josh., "BitLocker Team Chat", Retrieved at <<http://windowsconnected.com/forums/p/814/2860.aspx>>, Apr. 28, 2006, pp. 16.

"IBM System Storage DS8000", Retrieved at <<http://publib.boulder.ibm.com/infocenter/dsichelp/ds8000ic/topic/com.ibm.storage.ssic.help.doc/f2c_icoverview_36ljk2.pdf>>, Mar. 2009, pp. 158.

"Microsoft Windows Vista Ultimate 64-bit OEM", Retrieved at <<http://www.advantionline.com/Microsoft-Windows-Vista-Ultimate-64-bit-OEM.html>>, Retrieved Date: Mar. 16, 2010, pp. 10.

Corio, Chris., "An Introduction to Security in Windows 7", Retrieved at <<http://www.devx.com/MS_TechNet/Article/41761 >>, Retrieved Date: Mar. 16, 2010, pp. 5.

"Rocky Mountain RAM Responses to DOD Technical and Functional Requirements Related to McAfee® (formerly SafeBoot®) Mobile Data Security Products", Retrieved at <<http://www.rmram.com/govtsales/DOD/techinfo.htm >>, Retrieved Date: Mar. 16, 2010, pp. 9.

"Windows Vista Ultimate", Retrieved at <<http://www.creationengine.com/html/p.lasso?p=14967 >>, Retrieved Date: Mar. 16, 2010, pp. 4.

"Crypted disks with remote key placed on http server", Retrieved at <<http://linux.xvx.cz/2009/06/crypted-disks-with-remote-key-placed-on-http-server/ >>, Jun. 7, 2009, pp. 3.

"Advances in BitLocker Drive Encryption", Retrieved from: http://technet.microsoft.com/en-us/magazine/cc510321.aspx., (Jun. 2008),4 Pages.

"BitLocker Protecting Data in Windows 7 and Windows Server 2008 R2", Retrieved from: download.microsoft.com/download/5/E/6/5E66B27B-988B-4F50-AF3A-C2FF1E62180F/ENT-T561_WH08.pptx., (2008),30 Pages.

"HP ProtectTools Client Security Manageability for Enterprise Customers with Managed IT", Retrieved from: http://h20331.www2.hp.com/Hpsub/downloads/FINAL_Enterprise%20WP-Security%20Manageability_4AA0-8657ENW.pdf., (May 2008),25 Pages.

"Win32_EncryptableVolume Class", Retrieved from: http://msdn.microsoft.com/en-us/library/aa376483(VS.85).aspx on May 18, 2009., 9 Pages.

U.S. Appl. No. 12/509,255, Amendment and Response filed Jul. 2, 2012, 11 pages.

US Final Rejection mailed Aug. 9, 2012, in U.S. Appl. No. 12/509,255 (12 pages).

US Amendment filed Nov. 9, 2012, in U.S. Appl. No. 12/509,255 (10 pages).

US Non-Final Office Action mailed Dec. 18, 2012, in U.S. Appl. No. 12/509,255 (8 pages).

Olzak, Tom. Recipe for Mobile Data Security: TPm, BitLocker, Windows Vista and Active Directory. Oct. 2007 (14 pages).

* cited by examiner

KEY PROTECTORS BASED ON ONLINE KEYS

BACKGROUND

As computer storage technology has advanced, high capacity storage devices have become increasingly commonplace. These devices can store a large amount of data, and some of these devices are portable in nature and easily lost or stolen. Similarly, virtual storage mediums such as virtual hard disks are making data much more transportable between devices. Storing large amounts of data on a storage device or virtual storage medium can be problematic for users because it can result in a large amount of data being exposed to a malicious user if the storage device or virtual storage medium is lost, stolen, or otherwise compromised. This can result in user frustration due to the vulnerability of the data they might want to store on such storage devices or virtual storage mediums.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method of creating a key protector for a storage media includes obtaining an online key. A master key for encrypting and decrypting the storage media or encrypting and decrypting one or more storage media encryption keys that are used to encrypt the storage media is encrypted based at least in part on the online key. An online key can be, for example, a key or other information protected by a remote service. A key protector for the storage media is stored, the key protector including the encrypted master key.

In accordance with one or more aspects, a method of accessing a user-protected storage media is implemented in a computing device. An online key associated with the user-protected storage media is obtained from a remote service. A key protector including an encrypted master key is obtained, the master key being for decrypting the user-protected storage media or decrypting one or more storage media encryption keys that are used to decrypt the user-protected storage media. The online key is used to decrypt the master key from the key protector.

BRIEF DESCRIPTION OF THE DRAWINGS

The same numbers are used throughout the drawings to reference like features.

DETAILED DESCRIPTION

Figure 1:
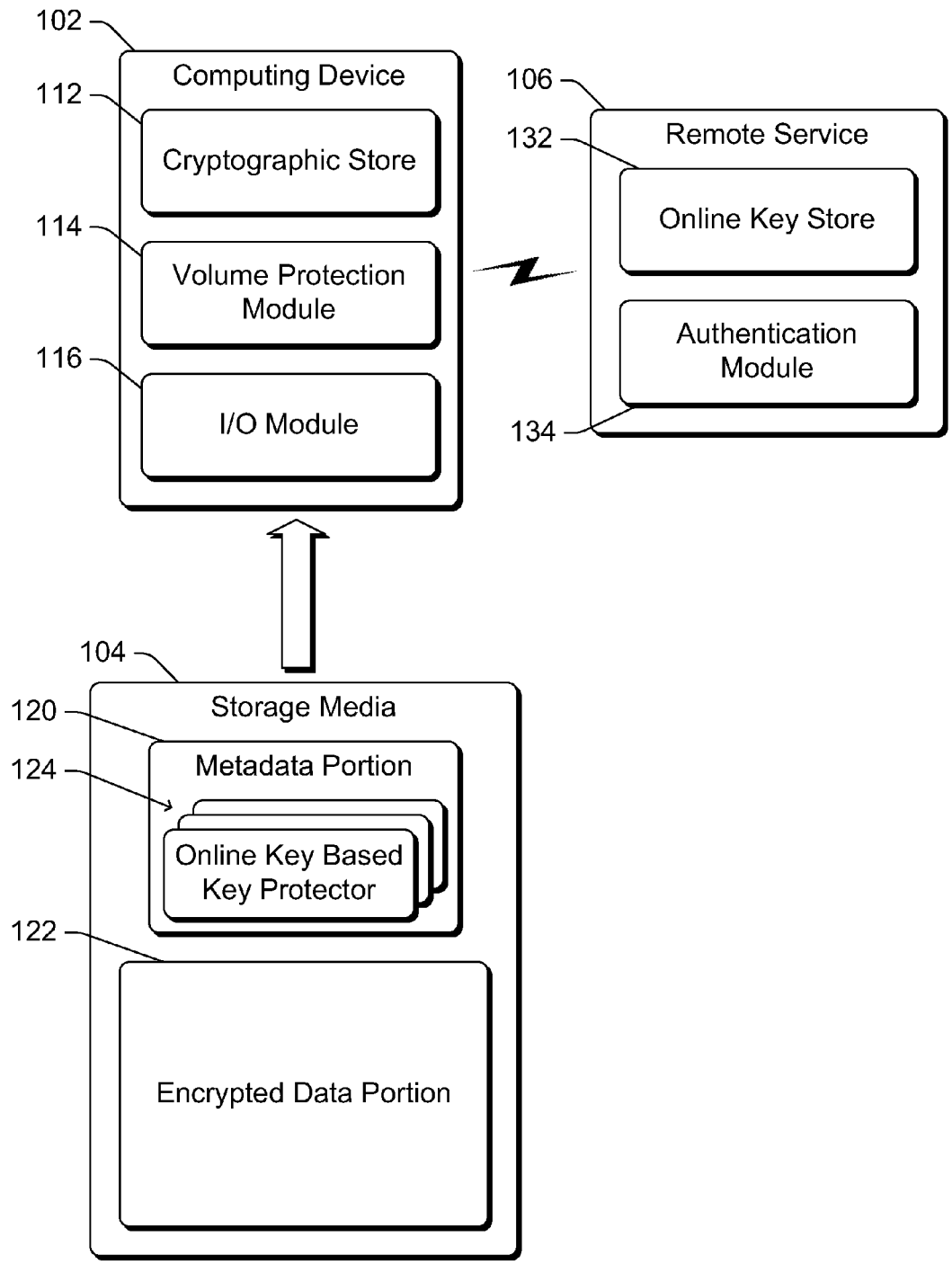
FIG. 1 illustrates an example system implementing the key protectors based on online keys in accordance with one or more embodiments.

Key protectors based on online keys are discussed herein. One or more key protectors are stored on a storage media and allow a user or group of users to access encrypted data on the storage media. One type of key protector is a key protector based on an online key. Data on the storage media is encrypted using a master key or one or more keys that are encrypted using the master key. A key protector based on an online key stores the master key encrypted based on the online key. The master key can be encrypted based on the online key alone, or alternatively based on the online key in combination with one or more local keys. A local key can be obtained based on various user inputs (such as user input of a password, user input of a personal identification number from a smartcard, etc.). The online key is protected by a remote service separate from the device accessing the storage media. The device accessing the storage media, or a user of that device, authenticates itself to the remote service in order to obtain the online key from the remote service.

References are made herein to symmetric key encryption, public key cryptography and public/private key pairs. Although such key cryptography and encryption is well-known to those skilled in the art, a brief overview of such is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key encryption, on the other hand, a shared key (also referred to as a symmetric key) is known by and kept secret by one or more entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key.

FIG. 1 illustrates an example system 100 implementing the key protectors based on online keys in accordance with one or more embodiments. System 100 includes a computing device 102 that can be coupled to a storage media 104. Storage media 104 can be a storage device implemented using a variety of different technologies, such as a flash memory device, a magnetic disk, an optical disc, combinations thereof, and so forth. Storage media 104 can also be a portion of a storage device that is treated by computing devices and operating systems logically as a storage device. For example, a storage media can be a partition of a hard drive, a portion of a flash memory device, and so forth. Storage media 104 can also be a virtual storage media, such as a virtual disk, that can be mounted by computing device 102 (e.g., by a virtual machine running on computing device 102). For example, a storage media can be a Virtual Hard Disk (VHD) file (e.g., on a flash memory device, on a magnetic disk, etc.) and mounted as a disk by a virtual machine running on computing device 102. Additional information regarding VHD files is available from Microsoft Corporation of Redmond, Wash. Thus, storage media 104 can be a physical storage media or a virtual storage media.

Storage media 104 can be coupled to device 102 in a variety of different wired and/or wireless manners. For example, storage media 104 can be coupled to device 102 via a Universal Serial Bus (USB) connection, a wireless USB connection, an IEEE 1394 connection, a Bluetooth connection, and so forth. Storage media 104 can be designed to be coupled to different computing devices (concurrently or at different times). In one or more embodiments, storage media 104 is a removable media, such as being part of a storage device designed to be easily coupled to and decoupled from computing device 102 and transported to other computing devices. An example of such a removable storage media is a thumb drive or USB flash memory device.

Alternatively, storage media 104 can take other forms, such as being a network storage device that is coupled to computing device 102 via a network (e.g., the Internet, a local area network (LAN), a public telephone network, an intranet, other public and/or proprietary networks, combinations thereof, and so forth), an internal storage media (e.g., internal hard drive) of computing device 102, and so forth. For example, storage media 104 can be a virtual storage media that is accessible via a network, such as being stored as one or more VHD files on one or more services accessible to device 102 via a network.

Computing device 102 can be a variety of different types of devices capable of communication with storage media 104. For example, computing device 102 can be a desktop computer, a mobile station, a netbook or laptop computer, a notepad computer, an entertainment appliance, a set-top box communicatively coupled to a display device, a cellular or other wireless phone, a music or video playback device, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

System 100 also includes a remote service 106. Remote service 106 can be implemented by one or more computing devices of the same or different types. Analogous to the discussion above regarding computing device 102, remote service 106 can be implemented using a variety of different types of computing devices. Remote service 106 is implemented on one or more devices that are separate devices from computing device 102, and thus is referred to as remote. Remote service 106 can be situated in close physical proximity to computing device 102 (e.g., in a same room or building) or further apart (e.g., in different states, different countries, etc.). Computing device 102 communicates with remote service 106 via a network, such as the Internet, a local area network (LAN), a public telephone network, an intranet, other public and/or proprietary networks, combinations thereof, and so forth. Computing device 102 can communicate with remote service 106 via one or more wired and/or wireless connections.

To protect the data stored on storage media 104, storage media 104 is encrypted using a volume-based or drive-based encryption technique. In one or more embodiments, storage media 104 is encrypted in response to a user request to protect storage media 104 (or a request from another component or module to encrypt storage media 104 for the user), and thus storage media 104 can also be referred to as a user-protected storage media. In a volume-based or drive-based encryption technique, entire volumes and/or drives are encrypted rather than individual files stored on those volumes and/or drives. In one or more embodiments, the encryption technique employed for encrypting and decrypting storage media 104 is the BitLocker™ drive encryption technique available from Microsoft Corporation of Redmond, Wash. Alternatively, other public and/or proprietary encryption techniques can be employed.

Computing device 102 includes a cryptographic store 112, a volume protection module 114, and an input/output (I/O) module 116. It is to be appreciated that computing device 102 can also include one or more additional components or modules for providing various functionality of computing device 102. Modules 114 and 116 can be implemented in software, firmware, hardware, or combinations thereof. When implemented in software or firmware, each of modules 114 and 116 includes one or more instructions that are executed by a processor or controller of computing device 102. Modules 114 and 116 are typically implemented as part of an operating system of computing device 102, although modules 114 and 116 can alternatively be implemented separate from the operating system. For example, rather than being included as part of an operating system of computing device 102, volume protection module 114 can be obtained from another source (such as a remote device, storage media 104, and so forth) and run by computing device 102 in order to access the encrypted data on storage media 104.

Cryptographic store 112 stores keys and/or other information supporting encryption and decryption performed by volume protection module 114. For example, cryptographic store 112 can store one or more of public keys of public/private key pairs, private keys of public/private key pairs, certificates, symmetric keys, and/or other data used for encrypting and/or decrypting data. Cryptographic store 112 can be maintained in a variety of different computer storage media of device 102, such as random access memory (RAM), flash memory, a magnetic disk, and so forth. Cryptographic store 112 can also optionally include an interface portion allowing other components and modules of computing device 102 to access data stored by cryptographic store 112. Such an interface portion of store 112 can be implemented in software, firmware, hardware, or combinations thereof.

I/O module 116 manages the input of data from storage media 104 and the output of data to storage media 104. I/O module 116 can communicate with storage media 104 using a variety of different connection and/or networking protocols dependent on the manner in which storage media 104 is configured to communicate with computing device 102. I/O module 116 also manages the transfer of data to and from remote service 106. I/O module 116 can communicate with remote service 106 using a variety of different connection and/or network protocols.

Volume protection module 114 supports the particular encryption technique used to protect storage media 104. Accordingly, when storage media 104 is coupled to or mounted by computing device 102, computing device 102 is able to access the encrypted data on storage media 104 using a key protector as discussed in more detail below.

Storage media 104 includes a metadata portion 120 and an encrypted data portion 122. Encrypted data portion 122 stores data files that have been encrypted (individually or otherwise) and various other data regarding the protection of storage media 104, such as locations of various data structures or other information on storage media 104, digital signatures over one or more portions of storage media 104, and so forth. Metadata portion 120 stores various information regarding storage media 104 and/or encrypted data portion 122, such as one or more key protectors based on online keys (online key based key protectors) 124, a metadata validation field, and so forth. In one or more embodiments, encrypted data portion 122 is encrypted using a volume-based or drive-based encryption technique as discussed above, and metadata portion 120 is an unencrypted portion of storage media 104 that is not encrypted using a volume-based or drive-based encryption technique as discussed above. Although metadata portion 120 may be an unencrypted portion of storage media 104, some of the data stored in metadata portion 120 may be encrypted (e.g., portions of online key based key protector 124 as discussed in more detail below).

Online keys refer to keys that are protected by remote service 106 and associated with a particular computing device 102 and/or a particular user of a computing device 102. The online keys can be stored by remote service 106 and/or decrypted by remote service 106 as discussed in more detail below. An online key can be generated in a variety of different manners, such as by using one of a variety of different conventional random or pseudo-random number generators. The online key can also be generated based on or using other information, such as based on a token (e.g., including a statement of the user name of the user of computing device 102 provided by remote service 106) or other information provided by remote service 106 that identifies a user of computing device 102. For example, a hash value can be obtained by applying a conventional hash function to a token generated by remote service 106 for a user of computing device 102, and the hash value used as the online key.

Each key protector 124 is a structure that stores one or more encrypted keys that allow portion 122 to be decrypted. As storage media 104 is encrypted using a volume-based or drive-based encryption technique, the one or more encrypted keys in a key protector 124 allow the numerous encrypted data files and other data in portion 122 to be accessed (rather than permitting access to only a single encrypted file). Multiple key protectors 124 can be included on storage media 104 and can be stored using a variety of different data structures. Key protectors 124 are based on an online key as discussed in more detail below. Additionally, one or more other key protectors that store encrypted keys based on other encryption techniques, such as TPM (Trusted Platform Module) based techniques, public/private key pair based techniques, and so forth can be stored on storage media 104 in metadata portion 120.

Data in encrypted portion 122 is protected using a set of multiple keys. In one or more embodiments, data in portion 122 is encrypted using a symmetric key referred to as a full storage media encryption key or storage media encryption key. A variety of different symmetric key cryptography algorithms or ciphers can be used to encrypt and/or decrypt the data using the storage media encryption key, such as AES, AES-CCM, DES, RC4, and so forth.

The storage media encryption key is encrypted using a different symmetric key referred to as a master key. A variety of different symmetric key cryptography algorithms or ciphers can be used to encrypt and/or decrypt the storage media encryption key using the master key, such as AES, AES-CCM, DES, RC4, and so forth. The same algorithm or cipher can be used to encrypt the storage media encryption key as is used to encrypt the data in portion 122, or alternatively different algorithms or ciphers can be used. The encrypted storage media encryption key is stored on storage media 104, such as in portion 122 or alternatively elsewhere on storage media 104. Alternatively, the data in portion 122 can be encrypted using the master key, in which case the storage media encryption key need not be used.

The master key is encrypted based at least in part on the online key. The master key can be encrypted using the online key, or alternatively using a combination of the online key and one or more local keys. A variety of different (e.g., symmetric key) cryptography algorithms or ciphers can be used to encrypt and/or decrypt the master key, such as AES, AES-CCM, DES, RC4, and so forth. The same algorithm or cipher can be used to encrypt the master key as is used to encrypt the storage media encryption key and/or used to encrypt the data in portion 122, or alternatively different algorithms or ciphers can be used. The encrypted master key is stored in a key protector 124.

In embodiments in which the online key alone is used to encrypt the master key, the key used by the cryptography algorithm or cipher to encrypt and/or decrypt the master key is the online key. Accordingly, in one or more embodiments the online key is used as a symmetric key to encrypt and/or decrypt the master key.

In embodiments in which the online key is used with one or more local keys, the online key and the one or more local keys are combined to generate a combined key. This combined key is the key (e.g., symmetric key) that is used by the cryptography algorithm or cipher to encrypt and/or decrypt the master key. The online key and the one or more local keys can be combined in different manners, using any of a variety of mathematical operations or applying any of a variety of algorithms or processes to the online key and the one or more local keys. For example, the online key and the one or more local keys can be combined by using an "exclusive-OR" operation with the online key and the one or more local keys as inputs to the "exclusive-OR" operation and using a result of the exclusive-or operation as the combined key, by adding the online key and the one or more local keys together, by concatenating the online key and the one or more local keys, by using all of the online key and the one or more local keys as inputs to a hash function or key derivation function and using the output of the function as the combined key, and so forth.

The online key and the one or more local keys can also be combined by encrypting one of the online key and the one or more local keys using a variety of different symmetric key cryptography algorithms or ciphers analogous to the discussion above, and can be the same symmetric key cryptography algorithm or cipher as discussed above or a different symmetric key cryptography algorithm or cipher. The online key can be encrypted using the one or more local keys (or some value derived from the one or more local keys), and if there are multiple local keys those local keys can, for example, be combined to generate a key to use to encrypt the online key, one local key can be used to encrypt another local key which can be used to encrypt the online key, and so forth. Alternatively, the one or more local keys can be encrypted using the online key (or some value derived from the online key).

The online key and the one or more local keys can also be combined by encrypting the master key with one of the online key or a local key, and then encrypting the result of that encryption with another of the online key or a local key. For example, the master key can be encrypted with a local key, and the result of that encryption can be encrypted with the online key. By way of another example, the master key can be encrypted with the online key, the result of that encryption can be encrypted with a first of multiple local keys, and the result of that encryption can be encrypted with a second of multiple local keys, and so forth.

It should be noted that the various techniques discussed herein for combining an online key and one or more local keys can also be combined and performed in any order. It should also be noted that the various techniques discussed herein for combining an online key and one or more local keys are only examples, and that other techniques can alternatively be used for combining an online key and one or more local keys.

Multiple such key protectors based on an online key can be associated with the same or different entities, allowing different entities to access the data in portion 122 and/or to allow an entity to identify itself in different manners. These different entities can be, for example, different users, different groups of users, and so forth. By encrypting the master key based on the online key, the same master key can be used with these multiple key protectors.

Remote service 106 provides protection for online keys by providing decryption support and/or storage for online keys. In one or more embodiments, volume protection module 114 generates an online key, encrypts the online key using a public key of remote service 106, and stores the encrypted online key (e.g., in an online key based key protector 124). Volume protection module 114 can subsequently retrieve the online key by sending the encrypted online key to remote service 106, which in turn can decrypt and return the online key to computing volume protection module 114 (assuming that computing device 102 is authenticated as discussed in more detail below).

Remote service 106 optionally includes an online key store 132 and/or an authentication module 134. Online key store 132 stores online keys for computing device 102. Although a single computing device is illustrated in FIG. 1, remote service 106 can store online keys for multiple different computing devices. Online key store 132 associates the online key received from computing device 102 with an identifier of computing device 102 and/or an identifier of a user of computing device 102. The identifier of computing device 102 can be a name assigned to computing device 102 by remote service 106, an identifier provided by a trusted or secure processing component of computing device 102, an identifier generated based on the hardware and/or software configuration of computing device 102, and so forth. The identifier of a user of computing device 102 can be, for example, a user name (also referred to as a user ID) assigned to the user by remote service 106, a user name provided by a trusted or secure processing component of computing device 102, a user name submitted by a user and accepted by remote service 106, and so forth.

Authentication module 134 authenticates the identifier of computing device 102 and/or the identifier of the user of computing device 102. After the identifier of computing device 102 and/or the user of computing device 102 is authenticated, remote service 106 permits the online key associated with that identifier to be returned to computing device 102. Remote service 106 can obtain the online key to be returned to computing device 102 in different manners, such as by retrieving the online key from online key store 132, decrypting the encrypted online key received from volume protection module 114 using a private key of remote service 106, and so forth.

Authentication module 134 can authenticate the identifier of computing device 102 and/or the user of computing device 102 in different manners based at least in part on the particular identifier. For example, a user identifier can have an associated user password. The user can enter his or her user name and password at computing device 102, which transmits the user name and password to remote service 106. Authentication module 134 keeps a record of or otherwise has access to the passwords associated with user names. If authentication module 134 determines that the received password is the password associated with the received user name, then the user identifier is authenticated or verified as being correct; otherwise, the user identifier is not authenticated or verified as being correct. By way of another example, authentication module 134 can return the online key in a manner that the user of computing device 102 having a particular user name can obtain the online key but other users or computing devices cannot. For example, the online key can be encrypted using the password or a token associated with the user name, or a token can be the online key. This returning of the online key can have an expiration time (e.g., a particular date and time, a duration in minutes or hours, etc.), allowing the online key to be obtained and/or used only until the expiration time lapses. The expiration time can be enforced, for example, by volume protection module 114. For example, a token can be returned and used as the online key (or used to decrypt the online key) only until the token expires, a cookie can be returned and data included in the cookie used as the online key only until the cookie expires, and so forth. Thus, authentication module 134 can inherently authenticate the user of computing device 102 by returning the online key in a manner that prevents other users or computing devices from obtaining the online key.

By way of another example, an identifier of computing device 102 can be an identifier provided by a trusted or secure processing component of computing device 102. Authentication module 134 obtains the identifier from computing device 102 and can confirm (e.g., based on a digital certificate received with the identifier, based on one or more queries authentication module 134 sends to computing device 102, etc.) that the identifier was received from the trusted or secure process of computing device 102. Alternatively, authentication module 134 can return the online key associated with the identifier in a manner that the computing device 102 having that identifier can obtain the online key but other computing devices cannot. For example, the online key can be encrypted using the identifier, the online key can be encrypted with a public key of computing device 102, and so forth. Thus, authentication module 134 can inherently authenticate the identifier of computing device 102 by returning the online key in a manner that prevents other users or computing devices from obtaining the online key.

When an online key is returned to computing device 102 from remote service 106, volume protection module 114 maintains the online key in a secure manner, such as in cryptographic store 112. In one or more embodiments, authentication module 134 operates as an authentication component for a network or group of services. Computing device 102 obtains the online key when a user of computing device 102 logs into the particular network or group of services by being authenticated by authentication module 134. Volume protection module 114 maintains the online key while the user is logged into that particular network or group of services, and deletes the online key when the user logs out of or is otherwise no longer logged into that particular network or group of services. Thus, in such embodiments, the online key is available for use by volume protection module 114 to decrypt encrypted data portion 122 of storage media 104 only when the user of computing device 102 is logged into that particular network or group of services.

The online key can be combined with one or more local keys to generate a combined key as discussed above. The one or more local keys are protected by volume protection module 114 so that they can be obtained by authorized users but not obtained by non-authorized users. An authorized user is a user that authenticates himself or herself to volume protection module 114. Generally, a local key is protected by being encrypted or stored in a secure area, and then decrypted or retrieved from the secure area when the user authenticates himself or herself to volume protection module 114. The user typically authenticates himself or herself to volume protection module 114 in a different manner than the user authenticates himself or herself to authentication module 134 (e.g., not using the same user name and password as is provided to authentication module 134). This authentication can be providing a user name and password to volume protection module 114, making a smartcard or other device (e.g., a USB device storing an identifier) accessible to volume protection module 114, and so forth.

In one or more embodiments, a local key is protected by storing or sealing the local key on computing device 102 using a trusted or secure processing component. For example, a local key can be sealed using a storage root key (SRK) of TPM services of an operating system of computing device 102. Additional information regarding TPM services is available from Microsoft Corporation of Redmond, Wash. The sealed local key can be unsealed or retrieved from the TPM services in response to the user authenticating himself or herself to volume protection module 114.

By way of another example, a local key can be protected based on two additional keys (e.g., encrypted using a key that is a combination of the two additional keys), each of which can be generated using one of a variety of different conventional random or pseudo-random number generators. One of these two additional keys can be sealed using an SRK of TPM services of an operating system of computing device 102, and can be unsealed or retrieved from the TPM services in response to the user authenticating himself or herself to volume protection module 114. The other of these two additional keys can be stored on a USB flash drive, and can be obtained by the user connecting the USB flash drive to computing device 102 (allowing volume protection module 114 to obtain this additional key).

By way of yet another example, a local key can be protected based on two additional keys (e.g., encrypted using a key that is a combination of the two additional keys). A first of these two additional keys can be generated using one of a variety of different conventional random or pseudo-random number generators. This first additional key can be sealed using an SRK of TPM services of an operating system of computing device 102, and can be unsealed or retrieved from the TPM services in response to the user authenticating himself or herself to volume protection module 114. The second of these two additional keys is generated based on a password input by a user (e.g., this second additional key can be a hash value generated by applying a conventional hash function to the password input by the user). This second additional key can be sealed using an SRK of TPM services of an operating system of computing device 102, and can be unsealed or retrieved from the TPM services in response to the user authenticating himself or herself to volume protection module 114.

By way of another example, a local key can be protected based on a password input by a user. The local key can be encrypted based on the password input by the user (e.g., the symmetric key used to encrypt the local key can be a hash value generated by applying a conventional hash function to the password input by the user). The local key can be retrieved by the user inputting that same password to volume protection module 114.

Thus, in embodiments in which the online key is combined with one or more local keys, there are at least two different authentications that are to be satisfied in order for the master key to be decrypted (and thus in order for the data in encrypted data portion 122 to be decrypted). The first one or more authentications is the user authenticating himself or herself to volume protection module 114, allowing the one or more local keys to be decrypted. An additional authentication is the user authenticating himself or herself to authentication module 134 (and/or computing device 102 authenticating itself to authentication module 134), allowing the online key to be decrypted.

Figure 2:
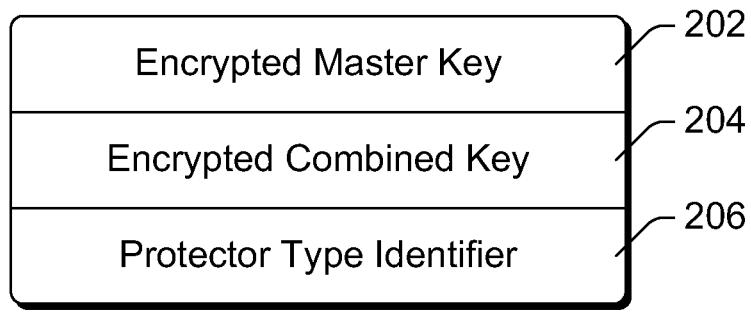
FIG. 2 is a block diagram illustrating an example key protector based on an online key in accordance with one or more embodiments.

FIG. 2 is a block diagram illustrating an example key protector 200 based on an online key in accordance with one or more embodiments. Key protector 200 can be, for example, a key protector 124 of FIG. 1.

Key protector 200 includes an encrypted master key portion 202, an encrypted combined key portion 204, and a protector type identifier portion 206. It is to be appreciated that the portions illustrated in the example of FIG. 2 are examples, and that alternatively one or more of the portions 202-206 need not be included in a key protector, that one or more additional portions can be added to a key protector, and/or that one or more of the portions 202-206 can be combined into a single portion.

Encrypted master key portion 202 includes the master key encrypted based on the online key. As discussed above, the master key can be encrypted using the online key or a combined key. Also as discussed above, a variety of different cryptography algorithms or ciphers can be used to encrypt the master key using the combined key such as AES, AES-CCM, DES, RC4, and so forth.

Encrypted combined key portion 204 includes the combined key encrypted using the master key. A variety of different cryptography algorithms or ciphers can be used to encrypt the combined key using the master key, such as AES, AES-CCM, DES, RC4, and so forth. The same algorithm or cipher can be used to encrypt the combined key as is used to encrypt other data or keys (e.g., the storage media encryption key, the data in portion 122 of FIG. 1, etc.) or alternatively a different algorithm or cipher can be used. In embodiments in which the master key is encrypted using the online key rather than a combination of the online key and one or more local keys, the online key encrypted using the master key is included in combined key portion 204 rather than an encrypted combined key.

Protector type identifier portion 206 includes a value that identifies key protector 200 as being a key protector based on an online key. As discussed above, other types of key protectors can be included in the metadata of a storage media, and the value in identifier portion 206 allows key protector 200 to be identified as a key protector based on an online key rather than a different type of key protector.

The identifier in protector type identifier portion 206 can also be referred to as metadata of key protector 200. Key protector 200 can also include various other metadata in one or more additional portions (not shown). For example, key protector 200 can include metadata that indicates the manner in which the online key and the one or more local keys are combined, metadata that indicates the manner in which the one or more local keys are protected, and so forth.

Key protector 200 can also optionally include the online key encrypted with a public key of a remote service (e.g., remote service 106 of FIG. 1). The online key encrypted with a public key of a remote service can be sent to the remote service so that the online key can be retrieved as discussed above.

It should be noted that the key protectors based on online keys discussed herein support easily changing (also referred to as rolling) the master key. As discussed above, the data on the storage media is encrypted using a storage media encryption key, which in turn is encrypted using the master key. To enhance the security of the encryption of the storage device, the master key can be changed at various times. The entire storage media need not be re-encrypted because the storage media encryption key is not changed. However, the key protectors based on online keys include the master key encrypted based on the online key, and the combined key encrypted using the master key. As the master key is changed, the key protector is also changed.

Key protector 200 includes the combined key encrypted using the master key in portion 204. If the master key is changed from one master key (referred to as the old master key) to a different master key (referred to as the new master key), then as part of the changing process the old master key can be used to decrypt the encrypted combined key. The combined key can be used to encrypt the new master key. The encrypted new master key replaces the encrypted old master key as the encrypted master key in encrypted master key portion 202. The new master key is also used to encrypt the combined key, and the combined key encrypted with the new master key replaces the combined key encrypted with the old master key as the encrypted combined key in encrypted combined key portion 204.

Alternatively, rather than (or in addition to) including the encrypted combined key, key protector 200 can include the online key encrypted using the master key, and the one or more local keys encrypted using the master key. In such situations, if the master key is changed from an old master key to a new master key, then as part of the changing process the old master key can be used to decrypt the encrypted one or more local keys and the encrypted online key. The one or more local keys and the online key can then be combined (in a variety of different manners as discussed above) and used to encrypt the new master key. The encrypted new master key replaces the encrypted old master key as the encrypted master key in encrypted master key portion 202. The new master key is also used to encrypt the online key, and the online key encrypted with the new master key replaces the online key encrypted with the old master key as the encrypted online key in key protector 200. Similarly, the new master key is also used to encrypt the one or more local keys, and the one or more local keys encrypted with the new master key replaces the one or more local keys encrypted with the old master key as the encrypted one or more local keys in key protector 200.

Figure 3:
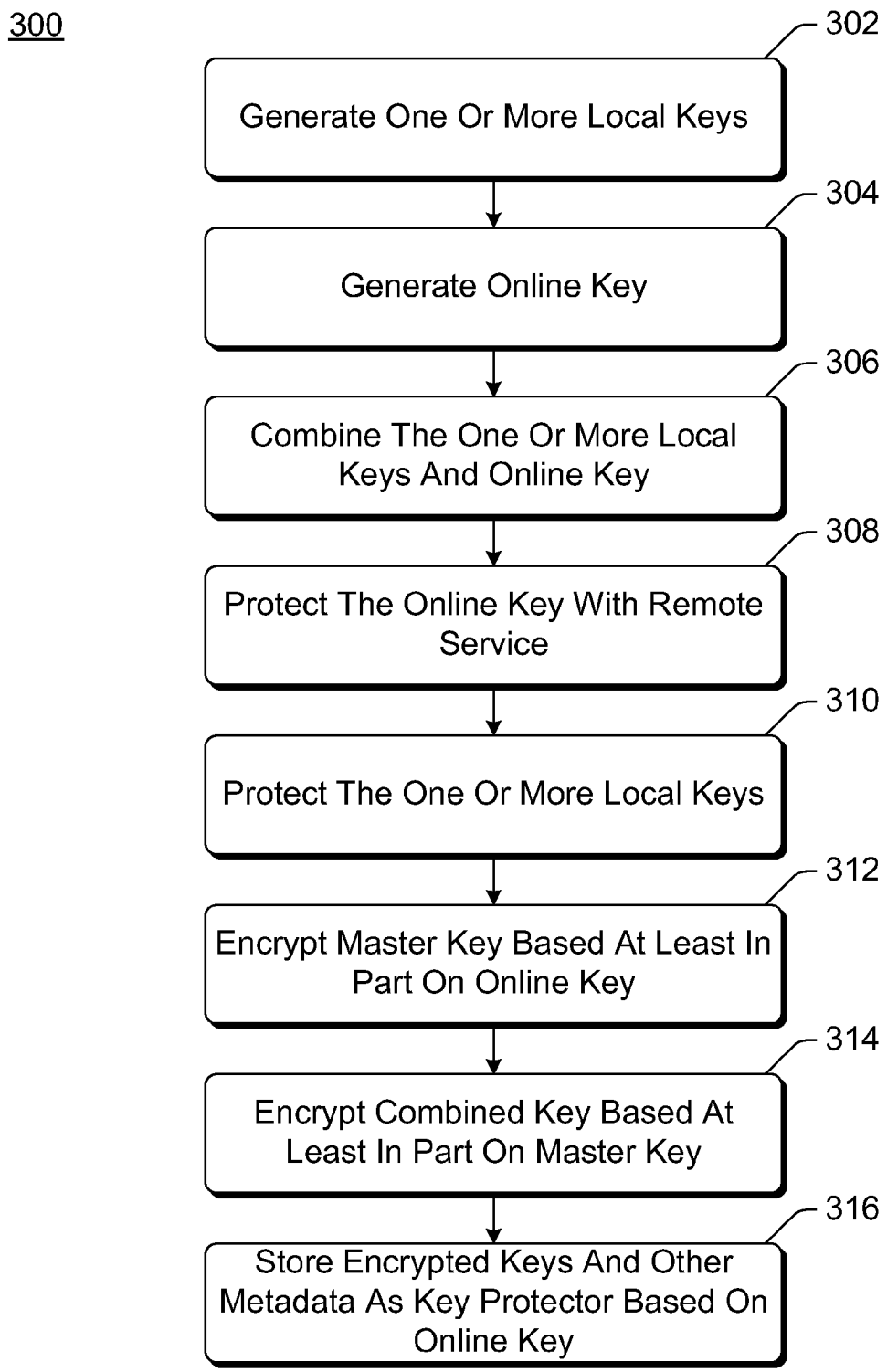
FIG. 3 is a flowchart illustrating an example process for creating a key protector based on an online key in accordance with one or more embodiments.

FIG. 3 is a flowchart illustrating an example process 300 for creating a key protector based on an online key in accordance with one or more embodiments. Process 300 can be carried out by a volume protection module of a computing device, such as module 114 of FIG. 1, or alternatively by another component or module and/or another device. Process 300 can be implemented in software, firmware, hardware, or combinations thereof. Process 300 is shown as a set of acts and is not limited to the order shown for performing the operations of the various acts. Process 300 is an example process for creating a key protector based on an online key; additional discussions of creating a key protector based on an online key are included herein with reference to different figures.

In one or more embodiments, process 300 is performed in response to a user request to protect or encrypt a storage media. Alternatively, process 300 can be performed manually and/or programmatically at other times, such as before the storage media is distributed to users, when the storage media is manufactured or distributed, and so forth.

In process 300, one or more local keys are generated (act 302). Each of the one or more local keys can be generated in a variety of different manners. In one or more embodiments, the one or more local keys are each an AES 256-bit key generated using one of a variety of different conventional random or pseudo-random number generators. Alternatively, the one or more local keys can be generated using a key agreement protocol, such as elliptic curve Diffie-Hellman (ECDH). The size (number of bits) of each of the one or more local keys can vary based on the cipher or algorithm using the local key.

An online key is generated (act 304). The online key can be generated in a variety of different manners, analogous to the generation of the one or more local keys in act 302. Alternatively, the online key can be obtained from another component, module, or device, such as from remote service 106 as discussed above. The online key can be generated in the same manner, or alternatively a different manner, than the one or more local keys in act 302.

The one or more local keys and the online key are combined (act 306) to generate a combined key. The one or more local keys and the online key can be combined in a variety of different manners as discussed above.

The online key is protected by a remote service (act 308). The online key can be protected by the remote service by, for example, being encrypted with a public key of the remote service or being stored by the remote service as discussed above. In one or more embodiments, if the remote service stores the online key then the online key is encrypted (e.g., using a public key of the remote service) and sent to the remote service, or alternatively is communicated to the remote service via a secure channel (e.g., using Kerberos, secure sockets layer (SSL), and so forth). As part of storing the online key with the remote service an identifier of the computing device sending the online key and/or a user of the computing device sending the online key is communicated to the remote service. The identifier can be sent with the online key, or alternatively can be communicated to the remote service separately.

The one or more local keys are also protected (act 310). Each of the one or more local keys can be protected in a variety of different manners as discussed above.

The master key is encrypted based at least in part on the online key (act 312). The master key can be encrypted, for example, using the combined key (and thus is based on the online key because the combined key is based on the online key), or using the online key. The master key is encrypted using one of a variety of different ciphers or algorithms as discussed above, and is encrypted, for example, using the combined key or the online key as the key.

The combined key is also encrypted based at least in part on the master key (act 314). The combined key is encrypted using one of a variety of different ciphers or algorithms as discussed above, and is encrypted, for example, using the master key as the symmetric key. The combined key can be encrypted using the same cipher or algorithm as used in act 312, or alternatively a different cipher or algorithm.

The encrypted keys generated in acts 312 and 314, as well as other metadata, are stored as a key protector based on an online key (act 316). The online key encrypted with the public key of the remote service (which can be generated in act 308) can also be stored as part of the key protector based on an online key. Examples of this other information include, for example, an indication that key protector 200 is a key protector based on an online key, an indication of the manner in which the online key and the one or more local keys are combined, and so forth.

The key protector in act 316 is, for example, a key protector 200 of FIG. 2. The key protector can be stored on the storage media itself as part of act 316, or alternatively the key protector can be stored on another device (e.g., and transferred to the storage media at a later time).

It should be noted that the process 300 of FIG. 3 assumes that the encryption of the data of the storage media using the storage media encryption key, as well as the encryption of the storage media encryption key using the master key, is being performed by another component or module and/or has already been performed. The key protector generated by process 300 stores the encrypted master key, allowing the key protector to be subsequently used to access the encrypted data on the storage media. If, however, the storage media has not already been encrypted, then the data of the storage media is encrypted using the storage media encryption key, and the storage media encryption key is encrypted using the master key as discussed above.

Process 300 is discussed with reference to a combined key. In other embodiments, the master key is encrypted using an online key and no combined key need be generated. In such embodiments, acts 302, 306, and 310 need not be performed, and the online key (rather than the combined key) is encrypted in act 314.

Returning to FIG. 1, in order to retrieve data from encrypted data portion 122, the data is decrypted based on a master key obtained from a key protector, such as an online key based key protector 124. In one or more embodiments, volume protection module 114 and I/O module 116 are implemented as part of an operating system of computing device 102. In such embodiments, storage media 104 can be accessed after the operating system has finished booting and is running.

In other embodiments, volume protection module 114 and I/O module 116 are implemented as part of a pre-execution environment (also referred to as pre-boot environment), which refers to an environment running on computing device 102 before the operating system has finished booting and is running. As part of this pre-execution environment, a volume protection module 114 and I/O module 116 are executed to allow the online key to be retrieved from remote service 106. In such situations, the volume protection module 114 and/or I/O module 116 can be stored on a component of computing device 102 (e.g., in read only memory (ROM) or flash memory), such as on a network interface card of computing device 102. Alternatively, the volume protection module 114 and/or I/O module 116 can be obtained from another computing device or service during the pre-execution environment. For example, the volume protection module 114 and/or I/O module 116 can be included as part of a boot image provided to the computing device 102 from another computing device or service.

The pre-execution environment can be implemented in a variety of different manners and can be based on a variety of different conventional techniques. For example, the pre-execution environment can be implemented in accordance with the Preboot eXecution Environment (PXE) standard version 2.0 or other versions. By way of another example, the pre-execution environment can be implemented in accordance with the Unified Extensible Firmware Interface (UEFI) standard version 2.3 or other versions. By way of yet another example, the pre-execution environment can be implemented using a variety of different personal computer basic input/output system (BIOS) versions.

It should be noted that by implementing volume protection module 114 and I/O module 116 as part of a pre-execution environment, storage media 104 can be a boot volume used to boot computing device 102. Encrypted data portion 122 can be encrypted, and can be decrypted using an online key based key protector 124 even though encrypted data portion 122 is part of the boot volume.

Figure 4:
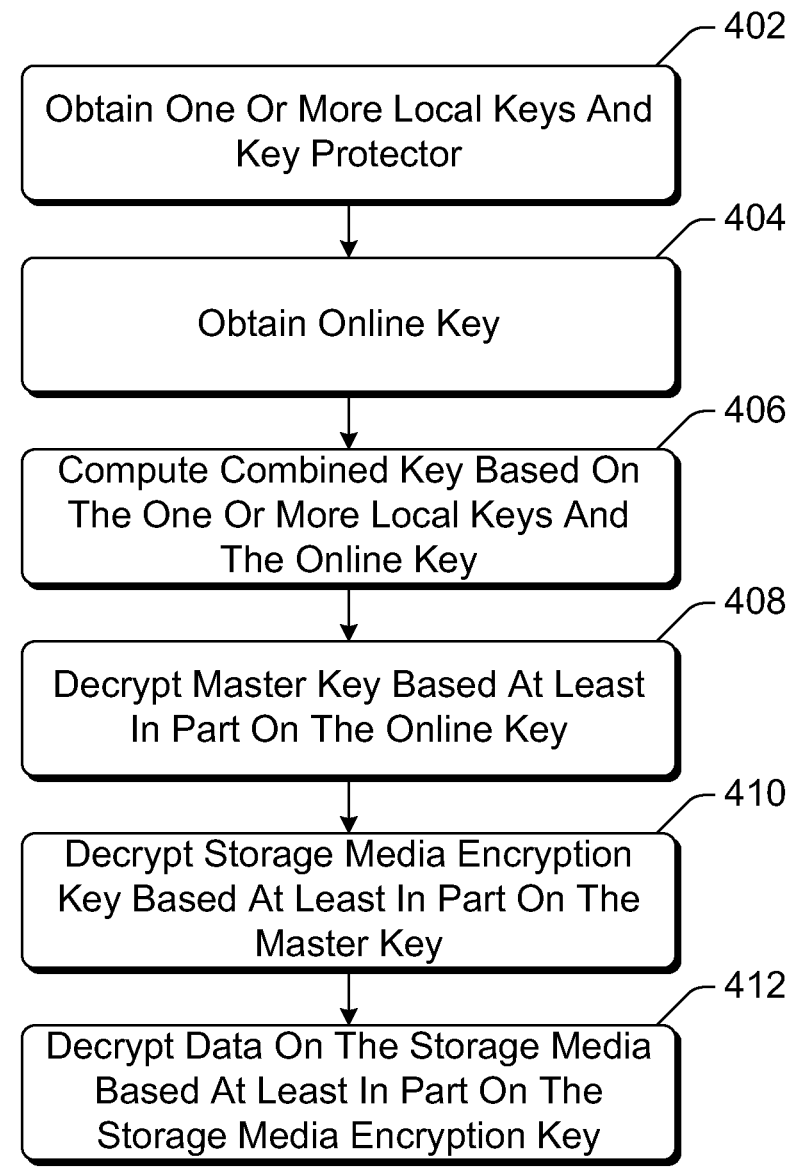
FIG. 4 is a flowchart illustrating an example process for using a key protector based on an online key to decrypt data on a storage media in accordance with one or more embodiments.

FIG. 4 is a flowchart illustrating an example process 400 for using a key protector based on an online key to decrypt data on a storage media in accordance with one or more embodiments. Process 400 can be carried out by a volume protection module of a computing device, such as module 114 of FIG. 1, or alternatively by another component or module. Process 400 can be implemented in software, firmware, hardware, or combinations thereof. Process 400 is shown as a set of acts and is not limited to the order shown for performing the operations of the various acts. Process 400 is an example process for using a key protector based on an online key to decrypt data on a storage media; additional discussions of using a key protector based on an online key to decrypt data on a storage media are included herein with reference to different figures.

In one or more embodiments, process 400 is performed in response to a request to access an encrypted storage media. Alternatively, process 400 can be performed at other times, such as when an encrypted storage media is coupled to the computing device implementing process 400, when a user enters his or her user name and password to the device implementing process 400, and so forth.

In process 400, the one or more local keys and key protector are obtained (act 402). Each of the one or more local keys can be obtained in a variety of different manners, and the particular manner in which each local key is obtained is dependent on the particular manner in which the local key is protected (e.g., in act 310 of FIG. 3), as discussed above. As part of act 402, the key protector is also obtained, and is typically obtained from the storage media although alternatively could be obtained from other components, modules, or devices.

The online key is also obtained (act 404) from a remote service, such as remote service 106 of FIG. 1. The online key is obtained by the computing device implementing process 400 authenticating itself to the remote service, or the user of the computing device implementing process 400 authenticating himself or herself to the remote service. The online key can be communicated from the remote service to the computing device via a secure channel (e.g., using Kerberos, SSL, and so forth), or can be otherwise protected (e.g., encrypted using a public key of the computing device implementing process 400, encrypted based on a secret provided by the computing device to the remote service (e.g., a secret encrypted with the public key of the remote service), etc.). This authentication to the remote service can be performed in a variety of different manners, as discussed above.

A combined key is generated based on the one or more local keys and the online key (act 406). The combined key can be generated in a variety of different manners, and the particular manner in which the one or more local keys and the online key are combined is dependent on the manner in which the one or more local keys and the online key were combined when the master key was encrypted. For example, the one or more local keys and the online key are combined in the same manner as the one or more local keys and the online key were combined in act 306 of FIG. 3.

The master key is decrypted based at least in part on the online key (act 408). A variety of different ciphers or algorithms can be used to decrypt the master key using the combined key, and the particular algorithm or cipher used is the decryption algorithm or cipher that corresponds to the encryption algorithm or cipher used to encrypt the master key (e.g., as discussed above in act 312 of FIG. 3).

The storage media encryption key is decrypted based at least in part on the master key (act 410). A variety of different ciphers or algorithms can be used to decrypt the storage media encryption key using the master key, and the particular algorithm or cipher used is the decryption algorithm or cipher that corresponds to the encryption algorithm or cipher used to encrypt the storage media encryption key using the master key.

Data on the storage media can then be decrypted based at least in part on the storage media encryption key (act 412). A variety of different ciphers or algorithms can be used to decrypt the data using the storage media encryption key, and the particular algorithm or cipher used is the decryption algorithm or cipher that corresponds to the encryption algorithm or cipher used to encrypt the data using the storage media encryption key.

Process 400 is discussed with reference to a combined key. In other embodiments, the master key is encrypted using an online key and no combined key need be used. In such embodiments, act 406 need not be performed.

The key protectors based on online keys discussed herein support various usage scenarios. For example, the key protectors based on online keys can be used to ensure that the encrypted storage media can be used only when the user of the computing device accessing the encrypted storage media is logged into a particular network. The user logs into the particular network by authenticating himself or herself to a remote service (e.g., remote service 106 of FIG. 1). The particular network could be a corporate or other business network, an online service accessed via the Internet (e.g., the Microsoft Windows Live™ network of internet services (additional information regarding the Microsoft Windows Live™ network of internet services is available from Microsoft Corporation of Redmond, Wash.)), and so forth. When the user is logged into the particular network, the remote service can return the online key for that user to the computing device being used by that user and accessing the encrypted storage media. Thus, the computing device is able to decrypt data from the encrypted storage media (assuming the computing device has performed any other desired authentication of the user). If the user of that computing device is not logged into the particular network (e.g., he or she has cannot currently access the particular network, the computing device has been lost or stolen, and so forth), then the computing device does not have the online key from the remote service and cannot access the data on the encrypted storage media.

By way of another example, an administrator of the remote service (e.g., remote service 106) can revoke an online key stored by the remote service whenever he or she desires. Thus, for example, the administrator can revoke the online key associated with a user if a user of a company-issued computing device leaves the company, or if the user reports that his or her computing device has been lost or stolen, or if an attempted attack by a malicious user is detected (e.g., if greater than a threshold number of incorrect attempts to input a password are received), and so forth. A revoked online key is not returned to a requesting computing device by the remote service, so the data on the encrypted storage media cannot be accessed.

By way of yet another example, the key protectors based on online keys can be used by an administrator of the remote service (e.g., remote service 106) or a network to enforce network proximity, providing alternate mechanisms for unlocking access to computing devices or augmenting existing mechanisms for unlocking access to computing devices. The online key is encrypted using a public key of the remote service (e.g., a server of remote service 106). The remote service can use its private key to decrypt and provide the online key to a computing device (optionally encrypted or otherwise protected so that computing devices other than the intended computing device cannot decrypt the online key). Thus, the administrator can ensure that a physical, pre-determined network connection is required for unlocking access to computing devices (assuming that virtual connections (e.g., virtual LAN connections) are not permitted or can be detected by the remote service), and thus in effect is requiring users to be inside a particular building (or buildings, or on a particular campus, etc.) in order to unlock access to their computing devices. The administrator can also ensure that if a user's computing device were to be lost or stolen, an attempt to use the computing device outside of that particular building (or buildings, or on a particular campus, etc.) would be unsuccessful.

In the discussions herein, reference is made to encryption based on or using a particular key (e.g., encryption of the master key, encryption of the one or more local keys, and so forth). It should be noted that such encryption can be based on the particular key as well as one or more additional keys or values combined with that particular key, and/or with one or more additional intermediary keys. For example, the combined key discussed herein can have an additional value added to it, and this combined key with the additional value added to it can be used to encrypt the master key. By way of another example, the combined key discussed herein can be used to encrypt a first intermediary key, the encrypted first intermediary key can be used to encrypt a second intermediary key, and the encrypted second intermediary key can be used to encrypt the master key.

Figure 5:
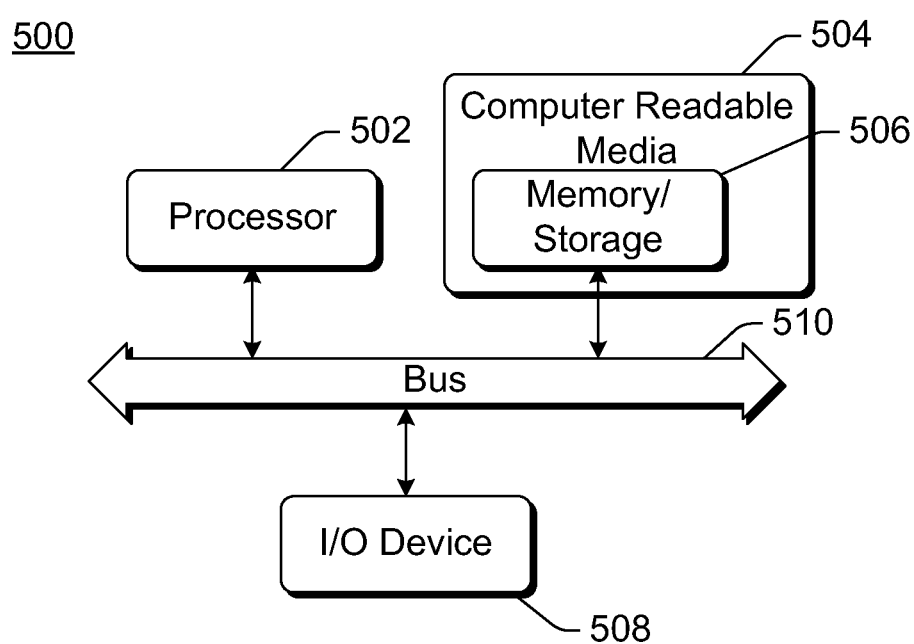
FIG. 5 illustrates an example computing device that can be configured to implement the key protectors based on online keys in accordance with one or more embodiments.

FIG. 5 illustrates an example computing device 500 that can be configured to implement the key protectors based on online keys in accordance with one or more embodiments. Computing device 500 can be, for example, computing device 102 of FIG. 1 or can be used to implement remote service 106 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth). Component 506 can be, for example, a storage media 104 of FIG. 1.

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the key protectors based on online keys techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of creating a key protector for a storage media, the method being implemented in a computing device and comprising:
    obtaining an online key, wherein the online key is protected by a remote service;
    generating one or more local keys;
    combining the one or more local keys and the online key to generate a combined key;
    encrypting, based at least in part on the combined key, a master key for encrypting and decrypting the storage media or one or more storage media encryption keys that are used to encrypt and decrypt the storage media; and
    storing a key protector for the storage media, the key protector including the encrypted master key.

2. A method as recited in claim 1, wherein obtaining the online key comprises obtaining the online key from the remote service.

3. A method as recited in claim 1, further comprising encrypting the online key using a public key of the remote service, and including the encrypted online key comprises in the key protector.

4. A method as recited in claim 1, wherein obtaining the online key comprises generating the online key, and the method further comprises storing the online key with the remote service, the online key being stored as associated with the computing device or a user of the computing device.

5. A method as recited in claim 1, wherein the storage media comprises a removable flash memory device.

6. A method as recited in claim 1, further comprising:
    protecting each of the one or more local keys so that each of the one or more local keys can be retrieved only after a user of the computing device has been authenticated.

7. A method as recited in claim 1, wherein encrypting the master key using the combined key comprises encrypting the master key using a symmetric key cryptography cipher that uses the combined key as a symmetric key.

8. A method as recited in claim 1, further comprising:
    generating an encrypted combined key by encrypting, based at least in part on the master key and the combined key; and
    including the encrypted combined key in the key protector.

9. A method as recited in claim 8, further comprising:
    obtaining a new master key;
    generating a new encrypted master key by encrypting, based at least in part on the combined key, the new master key;
    replacing the encrypted master key in the key protector with the new encrypted master key;
    generating a new encrypted combined key by encrypting, based at least in part on the new master key, the combined key; and
    replacing the encrypted combined key in the key protector with the new encrypted combined key.

10. A method of accessing a user-protected storage media, the method being implemented in a computing device and comprising:

obtaining, from a remote service, an online key associated with one or both of the computing device and a user of the computing device;

obtaining one or more local keys;

combining the online key and the one or more local keys;

obtaining a key protector including an encrypted master key, wherein the master key is for decrypting the user-protected storage media or decrypting one or more storage media encryption keys that are used to decrypt the user-protected storage media; and using the online key to decrypt the master key from the encrypted master key in the key protector, wherein using the online key to decrypt the master key comprises using the combined key to decrypt the master key from the encrypted master key in the key protector.

11. A method as recited in claim 10, wherein obtaining the key protector comprises obtaining the key protector from the user-protected storage media.

12. A method as recited in claim 10, wherein the online key is encrypted using a public key of the remote service, and wherein obtaining the online key comprises sending the online key encrypted using the public key of the remote service to the remote service and obtaining the online key from the remote service after having been decrypted by the remote service using a private key of the remote service.

13. A method as recited in claim 10, wherein the method is performed in a pre-execution environment of the computing device, and wherein the user-protected storage media comprises a boot volume used to boot the computing device.

14. A method as recited in claim 10, wherein combining the online key and the one or more local keys comprises using the online key and the one or more local keys as inputs to an exclusive-or operation, and using a result of the exclusive-or operation as the combined key.

15. A method as recited in claim 10, wherein using the combined key to decrypt the master key comprises using a symmetric key cryptography cipher to decrypt the master key, and wherein the symmetric key cryptography cipher uses the combined key as a symmetric key.

16. A method as recited in claim 10, wherein obtaining the online key comprises receiving the online key from the remote service in response to the computing device being authenticated by the remote service.

17. A method as recited in claim 10, wherein obtaining the online key comprises receiving the online key from the remote service in response to the user of the computing device being authenticated by the remote service.

18. A method as recited in claim 10, wherein obtaining the online key comprises:

receiving a token from the remote service in response to the user of the computing device being authenticated by the remote service; and applying a hash function to the token to generate a hash value that is the online key.

19. One or more computer storage media devices having stored thereon instructions that, when executed by one or more processors of a computing device, cause the one or more processors to:

generate one or more local keys;

generate an online key;

combine the one or more local keys and the online key to generate a combined key;

protect the online key by encrypting the online key with a public key of a remote service;

protect each of the one or more local keys so that each of the one or more local keys can be retrieved only after a user of the computing device has been authenticated;

encrypt, using a symmetric key cryptography cipher that uses the combined key as a symmetric key, a master key for encrypting and decrypting one or more storage media encryption keys that are used to encrypt a storage media;

encrypt the combined key based at least in part on the master key; and store, on the storage media, a key protector for the storage media, the key protector including the encrypted master key, the encrypted combined key, and the online key encrypted with the public key of the remote service.

* * * * *